UNITED STATES PATENT OFFICE.

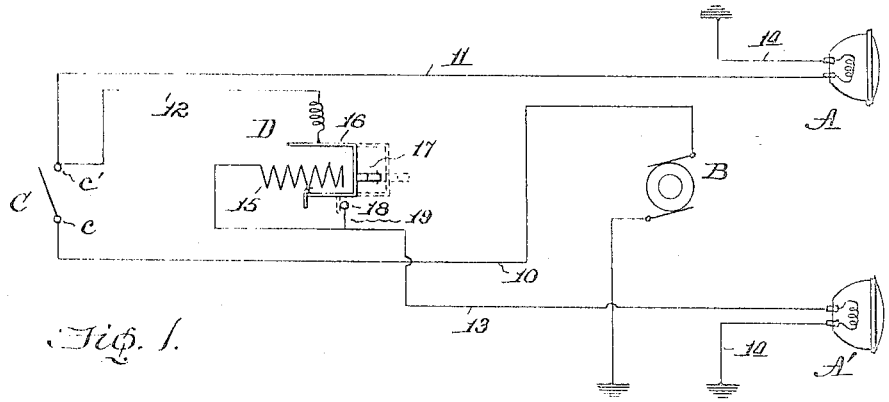
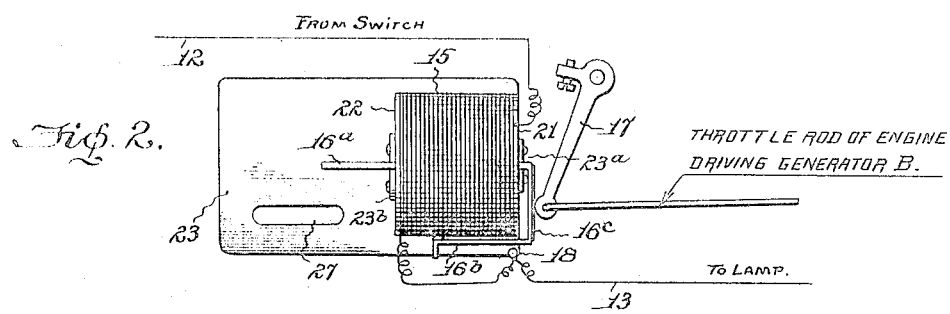
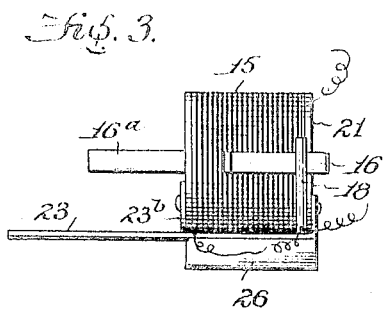 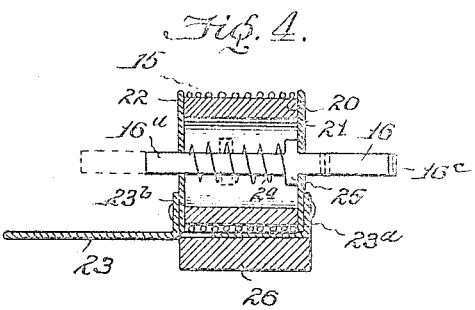
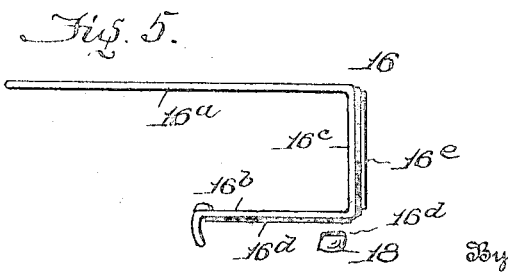

ALFRED A. LEUPOLD, OF PAMBRUM, SASKATCHEWAN, CANADA.

LIGHT-CIRCUIT CONTROLLER FOR AUTOMOBILES.

1,291,944.    Specification of Letters Patent.    Patented Jan. 21, 1919.

Application filed February 13, 1918. Serial No. 217,361.

*To all whom it may concern:*

Be it known that I, ALFRED A. LEUPOLD, a citizen of the United States, residing at Pambrum, in the Province of Saskatchewan and Dominion of Canada, have invented Light-Circuit Controllers for Automobiles, of which the following is a full and complete specification.

My invention relates to lamp control circuits, and more particularly to the system of distribution employed in connection with an automobile to supply the incandescent lamps used for the headlights, and has for its object the provision of means in the circuit to one of the lamps for gradually reducing the flow of current thereto as the speed of the magneto increases from a low point to a predetermined high point so that the current to the other lamp will furnish a more brilliant light than if an equal distribution were made to both lamps, and including means for short circuiting the resistance when said magneto is running beyond the predetermined high point of speed.

It is well known that in a Ford automobile the electric current generated by the magneto in addition to furnishing the necessary spark for the explosive charge in the engine is also employed to supply the current to the incandescent lamps used as the headlights; but as the current generated by the magneto is limited according to the varying speed of said magneto and engine driving it the brilliancy of the lights varies accordingly—being rather dim when the engine and magneto are running at low speed and brighter as the speed increases. Therefore, with this system of lighting, when the automobile is running at comparatively low speed the light furnished by the distribution of the current to the two lamps is not sufficient to properly light up the roadway, the required brilliancy of the said lamps being attained only when the automobile is running at comparatively high speed and consequently the speed of the magneto is sufficient to supply a normal amount of current. In order to remedy this disadvantage in the lighting circuit of a Ford automobile it has been proposed to cut out one of the lamps until the automobile engine and magneto reach a predetermined high speed, so as to divert all of the lighting current from the magneto to a single lamp; but this arrangement is objectionable in those instances where, in the operation of an automobile, it is required that both headlights be lighted during the running of the automobile. In order to comply with this requirement, and at the same time provide a more brilliant light in the lamp of one of the headlights during the running of the engine and magneto at comparatively low speed, I purpose introducing into the circuit of the other lamp a controller of particular construction which will gradually cut down the current to this lamp as the output from the magneto increases and allow the current to flow freely to the other lamp, and which will also equally distribute the current to both lamps by short circuiting the controller at and above a predetermined high speed of the engine and magneto.

The arrangement and operation of my improved lamp control circuits or lighting system for Ford automobiles, including the construction and operation of the controller, is fully disclosed in the following specifications, and what I claim as new, and desire to secure by Letters-Patent, is stated in the appended claims.

In the accompanying drawings:

Figure 1 is a diagrammatical view illustrating my improved system of distribution for lamp control circuits.

Fig. 2 is a plan view of the controller located in the circuit of one of the lamps.

Fig. 3 is a side view of said controller.

Fig. 4 is a vertical longitudinal sectional view of the controller, and

Fig. 5 is a detail view, hereinafter referred to.

Like numerals of reference indicate like parts in all the figures of the drawings.

Referring to the diagrammatical view (Fig. 1), showing the lighting circuits for the headlights of a Ford automobile, A A' designate the two headlights, B the magneto, and C the switch, these appliances being of the ordinary construction and forming part of the equipment of this type of automobile. In connection with these appliances I employ in the present instance a controller D, and rearrange the circuits from the magneto to the lamps so that said controller will be located in the circuit to one of the lamps to reduce the flow of current thereto and allow a normal flow to the other lamp under certain running conditions of the magneto and its consequent limited output of current, as will be hereinafter fully explained.

In carrying out my improvements in the lighting circuits one of the lamps, preferably that at the left-hand side of the automobile and designated A in the drawing, is connected directly to the magneto through the switch by means of a wire 10 from said magneto to the switch-point c, and from switch-point c' by wire 11 to said lamp; while the circuit from the switch-point c' to the other lamp A' includes the controller D, the connections being by wire 12 from switch-point c' to the controller, and by wire 13 from said controller to the lamp. The circuit of each lamp is grounded by a wire, as 14.

In the present instance the controller consists of a resistance coil 15 connected to the wire 13, and a conductor 16 slidable over the same and connected to the wire 12, said conductor being operated by a lever 17 so that as it is moved back and forth over the resistance coil it will increase and diminish the number of windings and consequently the amount of resistance between the conductor and wire connection 13 to the lamp. To operate this conductor I make use of the throttle-lever, as 17, (Fig. 2), so that as the throttle is opened to increase the speed of the engine and correspondingly increase the current output of the magneto driven by said engine the number of resistance-windings in the circuit described will be gradually increased as the current from the magneto increases making a distribution that will reduce the current to the lamp A' and supply normal current to the lamp A; in other words, the lamp A' will be kept dim by increasing the amount of resistance as the current output from the magneto increases, and current supplied to lamp A to produce a normal brilliancy in this lamp that will more effectively light the roadway than if the current was equally distributed to the two lamps.

In order to make an equal distribution to both lamps when the current generated by the magneto is sufficient to produce brilliant lights in the two lamps, as when the engine which operates the magneto is running to drive the automobile at or beyond a certain predetermined speed, say 15 miles an hour, I provide for cutting out the resistance coil by locating a post or contact 18 at the outer end of the resistance-coil and in the path of a member of the sliding conductor, connecting said post to the wire 13 by a short wire 19. Now when the conductor is in contact with this post the circuit to lamp A' will be from switch-point c' by wire 12 to conductor 16, to said post 18, and by wire 19 to wire 13 extending to the lamp.

The controller may be of any approved construction, but that herein shown is preferred in that it is simple in construction and effective in operation; consisting of a cylinder 20 around which the resistance wire 15 is wound and provided at its ends with heads 21 and 22 through which one member, as $16^a$, of the conductor 16 passes to support the latter in slidable engagement with said cylinder and so that the contact member $16^b$ may travel back and forth over the resistance coil to and from the post or contact-member 18. The cylinder is connected to a supporting-base 23, which is a plate from which lips $23^a$ and $23^b$ are struck up to receive the cylinder between them, said lips being suitably secured to the heads of the cylinder but insulated therefrom. As will be noted the conductor 16 is U-shape to provide the parallel members $16^a$ and $16^b$ and connecting member $16^c$, against which latter the throttle lever 17 bears, and in order that said conductor may follow the throttle-lever 17, as the latter is moved away from the controller, the conductor is projected by means of an expansion spring 24, located in the cylinder and interposed between the rear head 22 and lugs 25 on the supporting-member $16^a$ of the conductor. For attaching this device to the frame of an automobile in such position as to locate the slidable conductor properly with respect to the throttle-lever 17, a block 26 is secured beneath the forward end of the supporting-base or plate 23 and a bolt-opening 27 provided near the other end of the plate; said bolt-opening in the present instance being in the form of a slot so that any required adjustment of the device may be made. Of course the head 21 of the cylinder is made of suitable material which will conduct the current from the connection of the wire 12 at the outer edge thereof to the conductor 16 by way of the member $16^a$ thereof which is in slidable contact with the aforesaid head 21; suitable insulation being provided between the cross-bar $16^c$ and the throttle-lever, and, also, the said head, as well as the resistance-wire are suitably insulated from the plate 23 forming the supporting-base; and, furthermore, in order to prevent premature contact between the contact-member $16^b$ of the conductor and the post 18, either the inner side of said post or adjacent side of the contact-member may be, and preferably is, provided with a strip of insulating material, or both so provided as indicated in Fig. 5. These are merely details of construction which may be changed or modified as may be desired or found more suitable, and, likewise, other changes may be made in the form or arrangement of the parts of the controller within the spirit and scope of my invention and claims.

The construction, operation and practical advantages of my improved lighting circuits or current distribution for Ford automobiles will be readily understood from the foregoing description, in connection with the accompanying drawings; for although both lamps of the headlights are supplied with current all the while the magneto is running and generating current the controller will gradually reduce the current to one of the lamps during the running of said magneto from a very low speed—as for instance an automobile speed of four miles an hour—to keep up normal brilliancy in the other lamp until the speed of the magneto is sufficient to furnish a normal amount of current to both lamps—as when the automobile is running at a speed of fifteen miles an hour—at which the sliding conductor 16 short circuits the controller D distributing the current to both lamps. In other words, when the speed of the automobile is very low the current distribution is even to keep both lamps lighted—the conductor being in contact with the first winding of the resistance coil—and as the speed of the automobile increases up to 15 miles an hour the lamp having this controller in its circuit will be kept as dim as when the automobile was operated at the very low speed and the other lamp supplied with increasing current because it is more efficient to have one lamp bright and the other dim than to distribute the current equally and have both somewhat dim; both lamps being supplied equally when a sufficient speed is reached so that the resistance can be short circuited; the operation being effected through the medium of the throttle-lever which of course may be adjusted with respect to the movement imparted thereby to the sliding conductor. The particular advantage of having both lamps burning all the time the magneto is running, instead of cutting out one lamp entirely, as heretofore proposed, are of course so obvious as to not need any further explanation in this specification.

I claim:

1. In lighting circuits for automobiles, the combination with the magneto and headlights, of a circuit including one of the lamps, a circuit including the other lamp, and a controller in the circuit of one of the lamps comprising a resistance, a conductor slidable in connection therewith to increase and decrease the resistance up to a predetermined speed of the engine and magneto, a post with which the conductor contacts when moved beyond the point of maximum resistance to cut out the resistance in the circuit, and means for operating the conductor.

2. In lighting circuits for automobiles, the combination with the magneto and headlights, of a circuit including one of the lamps, a circuit including the other lamp, and a controller in one of the circuits comprising a resistance coil, a conductor having a contact member slidable over the coil to vary the number of windings in the circuit up to a predetermined speed of the engine and magneto, a post with which the conductor contacts when moved beyond the point of maximum resistance to entirely cut out the resistance coil, and means for moving the conductor.

3. In lighting circuits for automobiles, the combination with the magneto and headlights, of a circuit including one of the lamps, a circuit including the other lamp, and a controller in one of the circuits comprising a resistance-coil, a cylinder around which said coil is wound having opposite heads, a U-shaped conductor one member of which is supported slidably in the heads of the cylinder and the other member slidable over the coils to increase and decrease the number of windings in the circuit, and an operating lever engaging the cross-piece of the conductor to move the same.

4. In lighting circuits for automobiles, the combination with the magneto and headlights, of a circuit including one of the lamps, a circuit including the other lamp, and a controller in one of the circuits comprising a resistance-coil, a cylinder around which said coil is wound having opposite heads, a U-shape conductor one member of which is supported slidably in the heads of the cylinder and the other member slidable over the coils to increase and decrease the number of windings in the circuit, a spring for moving the conductor in one direction, a lever for moving the said conductor in the other direction, and a contact-post with which the conductor engages to cut out the resistance in said circuit.

5. An attachment for the lighting circuits of an automobile comprising a supporting-base, a cylinder mounted thereon and having opposite heads, a resistance wire wound around the cylinder, a U-shape conductor one member of which is supported slidably in the cylinder and the other member slidable over the resistance-coil, a contact-point with which said conductor engages when moved in one direction, and a spring for projecting the conductor in one direction.

ALFRED A. LEUPOLD.